United States Patent [19]

Eichholz

[11] Patent Number: 4,763,116

[45] Date of Patent: Aug. 9, 1988

[54] INPUT APPARATUS FOR DESIGN WORK ON AN IMAGE-BEARING SCREEN

[76] Inventor: Willi Eichholz, Haydnstrasse 9, D-4010 Hilden, Fed. Reg. of Germany

[21] Appl. No.: 759,587

[22] Filed: Jul. 25, 1985

[30] Foreign Application Priority Data

Jul. 30, 1984 [DE] Fed. Rep. of Germany ....... 3428045

[51] Int. Cl.$^4$ ............................................. G09G 3/02
[52] U.S. Cl. .................... 340/710; 340/709
[58] Field of Search ....................... 340/709, 710, 706; 178/18; 33/27.07, 27.04; 364/518, 521; 273/148 B

[56] References Cited

U.S. PATENT DOCUMENTS 4,561,183 12/1985 Shores ................................ 340/710

OTHER PUBLICATIONS

Leon, N. "Thumbwheel Positional Control Unit", IBM Technical Disclosure Bulletin, vol. 21, No. 7, Dec., 1978.

Nomura, H. et al., "Mouse", IBM Technical Disclosure Bulletin, vol. 27, No. 6, Nov., 1984.

Electronics Week, Sep. 3, 1984.

Primary Examiner—John W. Caldwell, Sr.
Assistant Examiner—Tyrone Queen
Attorney, Agent, or Firm—Pearne, Gordon, McCoy & Granger

[57] ABSTRACT

An input device for design work on image-bearing screens with which, by analogue-type hand movements which are identical in direction and magnitude with the requirements sought, graphics can be generated as in a conventional manner with a drafting head, and straight-edge and dividers.

8 Claims, 3 Drawing Sheets

INPUT APPARATUS FOR DESIGN WORK ON AN IMAGE-BEARING SCREEN

In the following there is described an input apparatus for design work on an image-bearing screen, or a plotter or the like, which combines and retains the advantages of the conventional hand tools available to the designer.

Keyboards, joysticks, roller balls ("mice"), digitising boards, light pens and so on do not represent a direct equivalent of the tools which are ergonomically optimum for use by the designer, such as a drawing head, ruler or straight-edge, and compasses.

In order to provide, with the aid of these conventional tools available to the designer, the digital and numerical information needed by the computer (angular position, position and length of points, lines and circles) it is accordingly proposed, by means of a combination of a rotatable disc or arc control member with electronic sensing of its angular position—similar to the known drafting head in drafting machines—and one or two rotatable knurled wheels or line control members, displaced at 90° to one another, each operating likewise with electronic sensing of the path through which the wheel rolls, to work with a substitute for a ruler or straight-edge.

These components could be arranged individually or they could be coupled together kinematically or indeed they could best be combined together in an optimum manner by mounting the knurled wheels in the rotary disc.

Figure 1:
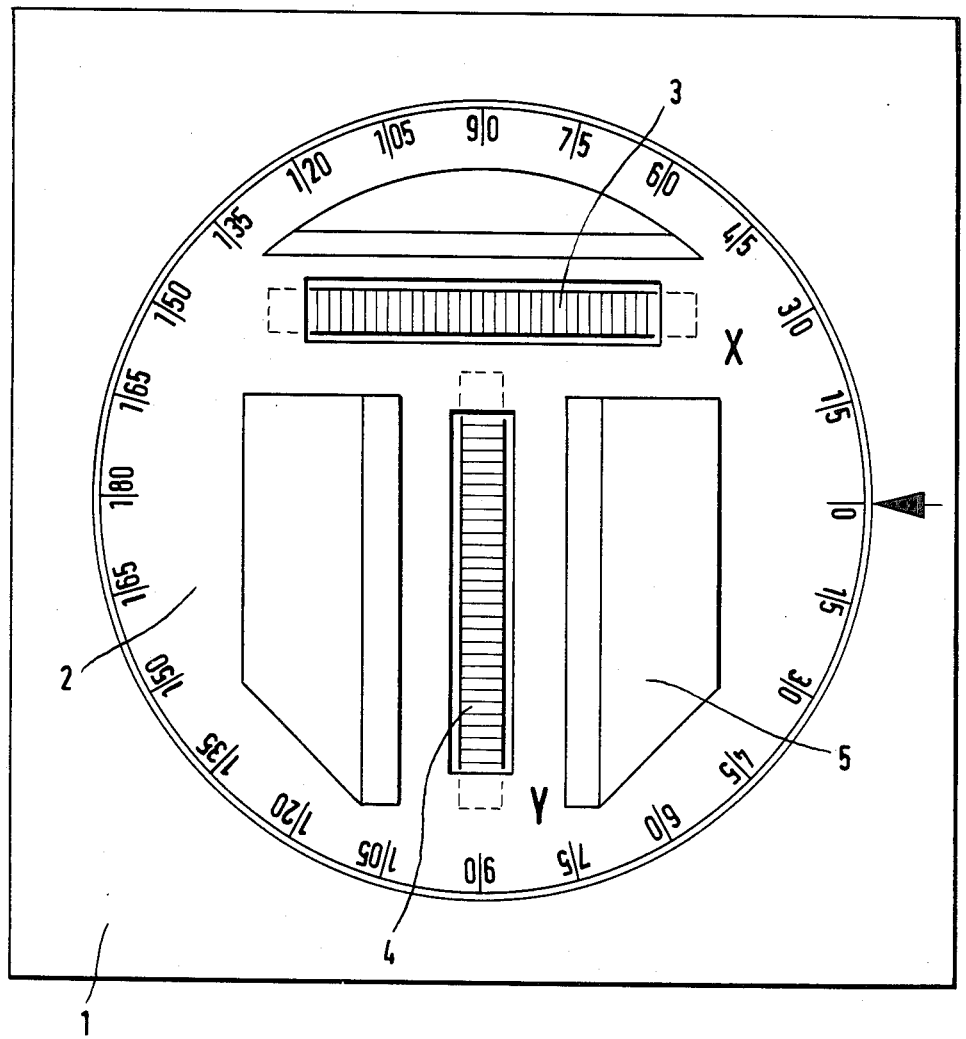
Figure 2:
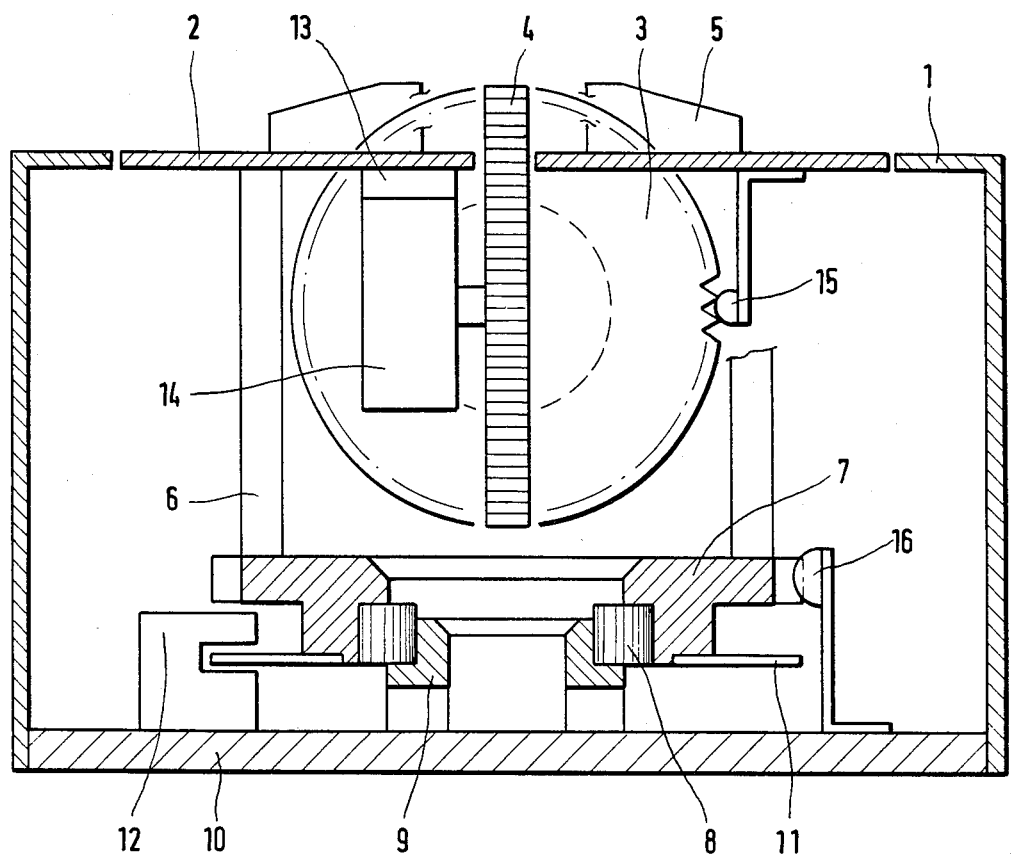
Figure 3:
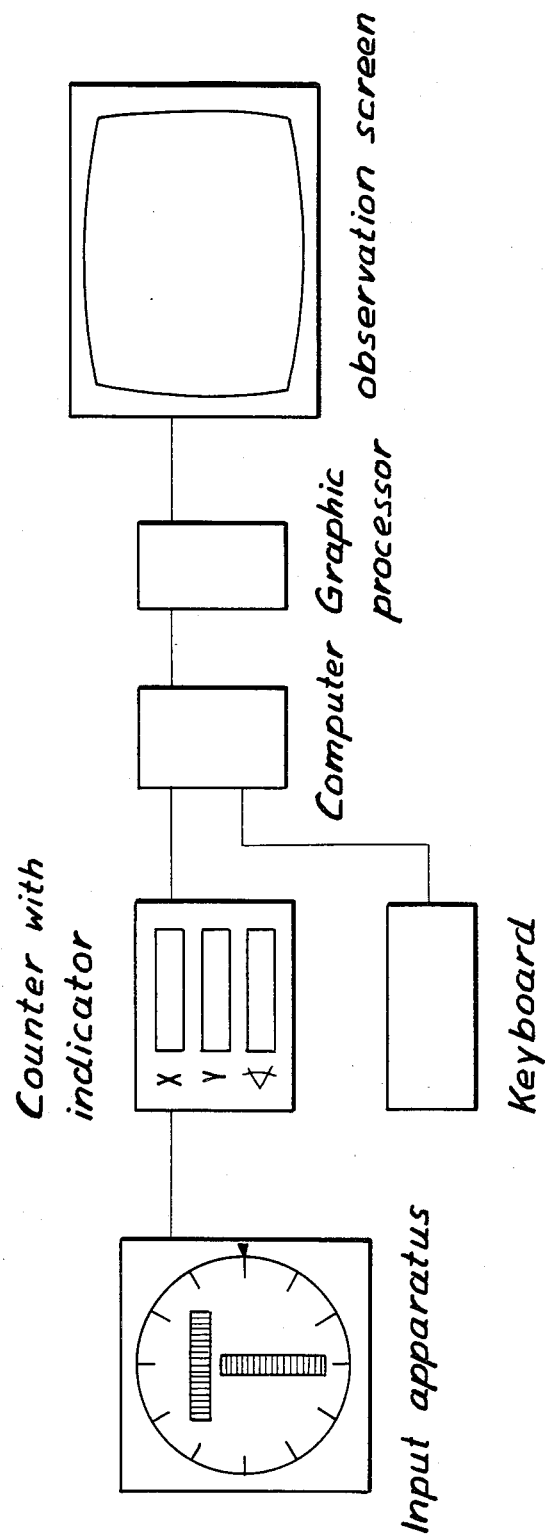

FIG. 1 shows a plan view of such an input device
FIG. 2 shows a section through an input device
FIG. 3 shows the device in an operative circuit with the other electronic components.

For facilitating the making of small displacement movements of the knurled wheels in an ergonomically optimum manner, these are provided with mechanical detents similar to the electronic hand wheels of machine tools, which also have an identity of mechanical and electronic increments.

The linear paths are formed in an incremental mode analogous to hand movement (rubber band principle, track mode).

On rotation of the knurled wheels there results on the screen a graphic display of an analogue type.

Whether the cursor or the crossed wires alone are moved or whether a line is drawn behind it as it moves is predetermined by control keys or buttons.

When the rotary disc is in an inclined position the resulting graphic display appears in a corresponding angular position.

If the positions of the centre and of a point on the periphery of a circle are determined initially be use of the cursor, an arc can be struck by rotating the head as with a pair of dividers or compasses.

As shown in FIG. 1 the rotary disc 2 is mounted to rotate in a housing 1. In addition there are rotatably mounted in this disc 2 the knurled wheels 3 and 4. Grasping portions or handles 5 mounted on the disc serve for ergonomically handling the head.

As shown in FIG. 2 the rotary disc 2 is rigidly connected to a detent disc 7 through pillars 6. This disc 7 is mounted to rotate on a base plate 10 by means of a rolling bearing 8 and intermediate ring 9.

A pulse-generating disc 11 mounted on the detent disc 7 is scanned opto-electronically by the fork-shaped opto-sensing device 12.

The knurled wheels 3 and 4 are rotatably mounted in the housings 14 which are connected to the rotary disc 2 by component 13.

A pulse generator can, for example, be mounted in this housing.

The teeth on the knurled wheels could for example also be scanned by fork-shaped opto-sensing devices.

The mechanical detent action on the knurled wheels and the detent disc is achieved by resiliently mounted detent pawls 15 and 16.

The electronic signals from the detent wheels can be carried away through leads passing through grooves or recesses formed in the ring 9.

Not illustrated are the further possibilities known in conventional drafting heads.

The axes of rotation of the knurled wheels could, as illustrated here, lie transverse to the axis of rotation of the rotary disc but they could equally well be arranged parallel to it.

In addition to the wheels illustrated here, still other rotary or translatory principles are possible as a substitute for a ruler or straight-edge.

I claim:

1. A device for inputting a graphic design to a computer comprising rotary disc means and wheel means adapted to be connected to a computer having at least one essentially planar graphical output device for reproducing a graphic design, said rotary disc means and wheel means being manually operable to input electronic signals to the computer to provide cursor movements and line images corresponding to said graphic design to be reproduced on said output device, said rotary disc means including an arc control member arranged for manual rotational movement to a desired angular orientation and first electronic means to sense the angular orientation of the arc control member and to provide a similar angular orientation in the plane of said output device to cursor movements and line images as they are inputted, said rotary disc means in a first mode of operation inputting an electronic signal to provide a line image along an arcuate path in response to the manual rotational movement of the arc control member and in a second mode of operation inputting an electronic signal to provide cursor movement along the arcuate path in response to the manual rotational movement of the arc control member, said wheel means including a line control member arranged for manual rotational movement and second electronic means to sense the rotational movement of the line control member and input electronic signals to provide cursor movements and line images along a straight line in the plane of said output device, said wheel means in a third mode of operation inputting an electronic signal to provide a line image along a linear path in response to the manual rotational movement of the line control member and in a fourth mode of operation inputting an electronic signal to provide cursor movement along the linear path in response to the manual rotational movement of the line control member.

2. A device according to claim 1, wherein said wheel means include a second line control member arranged for manual rotational movement and third electronic means to sense the rotational movement of the second line control member and input electronic signals to provide cursor movements and line images along a straight line in the plane of said output device, said wheel means in a fifth mode of operation inputting an electronic signal to provide a line image along a second linear path in response to the manual rotational movement of the second line control member, and in a sixth mode of operation inputting an electronic signal to provide cursor movement of the the second linear path in response to the manual rotational movement of the second line control member.

3. A device according to claim 2, wherein said line control members are mounted to said rotary disc for displacement with said arc control member upon rotational movement thereof.

4. A device according to claim 3, wherein said line control members are mounted to said arc control member.

5. A device according to claim 2, wherein said arc control member is mounted in said device for manual rotational movement about a Z axis, said first mentioned line control member is mounted for rotation about an X axis, said second line control member is mounted for rotation about a Y axis and said Z axis is orthogonal to said X and Y axes.

6. A device according to claim 5, wherein said first mentioned line control member and said second line control member are mounted at right angles to one another in said device, and said X and Y axes are perpendicular.

7. A device according to claim 6, wherein said arc control member is a rotatable disc and each of said line control members is a knurled wheel.

8. A device according to claim 7, wherein said knurled wheels are mounted to said rotatable disc.

* * * * *